3,477,491
WIPED-FILM EVAPORATOR
Carl Mac Henry, Ardsley, N.Y., and John A. Weaver, Berkeley, and Gordon D. Towell, Orinda, Calif., assignors to Shell Oil Company, New York, N.Y., a corporation of Delaware
Filed Jan. 16, 1968, Ser. No. 698,271
Int. Cl. B01d 1/22
U.S. Cl. 159—6                                   3 Claims

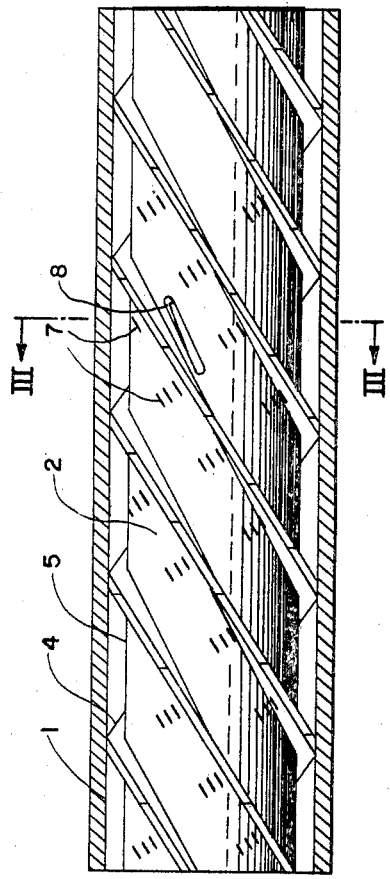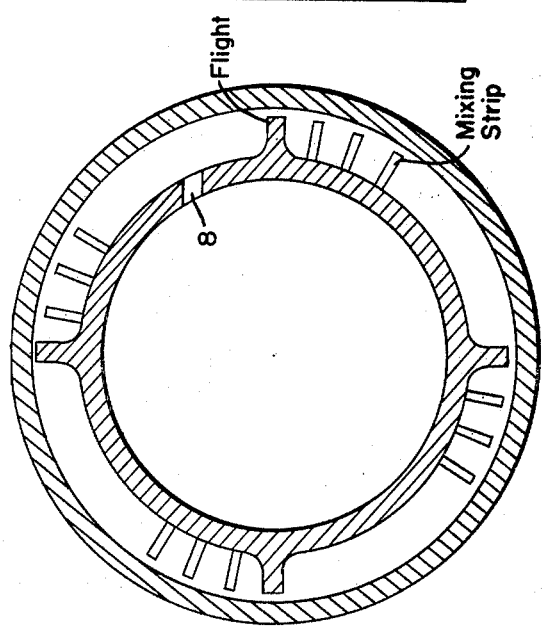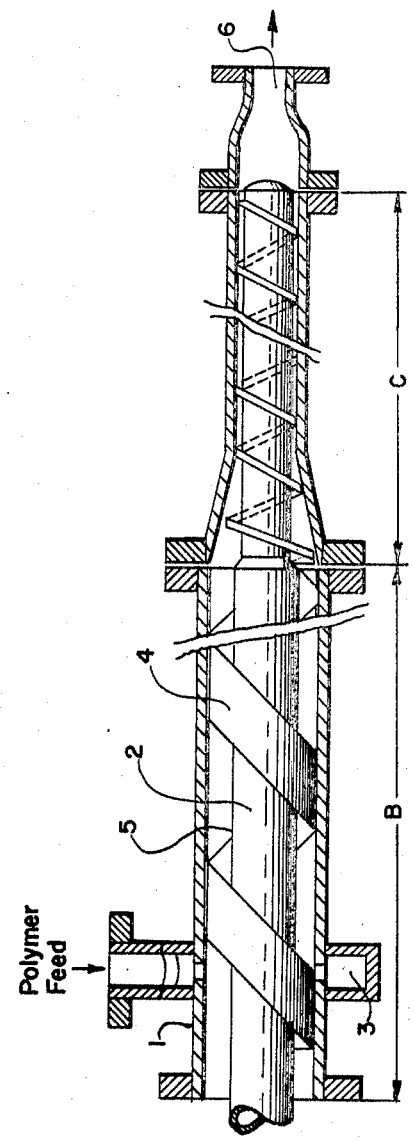
INVENTORS:
CARL MACHENRY
JOHN A. WEAVER
GORDON D. TOWELL
BY: *William H. Myers*
THEIR AGENT

United States Patent Office 3,477,491
Patented Nov. 11, 1969

ABSTRACT OF THE DISCLOSURE

A wiped-film evaporator having improved efficiency comprises a single screw evaporating section with narrow clearance combined with an annular vapor exhaust passage, the evaporating section being followed by a pumping section of reduced diameter for discharge of devolatilized product under superatmospheric pressure.

BACKGROUND OF THE INVENTION

This invention relates to a novel wiped-film evaporator. More particularly, it is concerned with an apparatus especially designed for the removal of substantial proportions of volatile components from synthetic plastics and the like containing the same.

Wiped-film evaporators are to be distinguished from devolatilizing extruders in that the former operates under vacuum throughout substantially all of their entire length and hence require only a short metering section of considerably smaller diameter, the screw being operated in such a fashion as to cause a relatively high rate of shear. Devolatilizing extruders, on the other hand, are designed particularly to operate only partially under vacuum, usually with feed and metering or throttle sections and a subsequent extrusion section under high pressure and in which the extruder screw has a relatively small clearance from the barrel requiring costly construction. Moreover, since the extruder is fitted with a nozzle at the terminal exit that section of the extruder must operate under relatively high pressure.

The problems involved in devolatilizing the reaction mixtures obtained in bulk polymerization of thermally sensitive and shear sensitive polymers such as polystyrene, nylon, cellulose derivatives and the like are solved only in part by the use of relatively complex and expensive twin-screw extruders. These usually operate at relatively high pressures and thus expose the polymers to degradation influences. Moreover, they require an extensive devolatilizing section or sections if it is necessary to reduce the volatiles to a relatively low level. In the case of high requirements for volatiles removal, as is sometimes the case in polystyrene and the like, the use of devolatilizing extruders is unduly expensive and relatively inefficient. Consequently, it is an object of the present invention to provide an apparatus especially designed for the removal of substantial proportions of volatile components such as monomers or solvents from synthetic thermoplastics and the like while at the same time minimizing the thermal degradation which normally occurs in devolatilizing extruders or similar pieces of apparatus.

SUMMARY OF THE INVENTION

Now, in accordance with the present invention, a single screw wiped-film evaporator is provided which comprises a vacuum section followed by an extrusion or pumping section of reduced diameter, a common single screw having a large diameter in the vacuum section passing through both sections, the screw comprising a core bearing multiple flights positioned to deposit a relatively thin film of the polymer on the interior wall of the barrel in the vacuum, the film being out of contact with the core, said core having a multiplicity of openings throughout the length of the vacuum section, the core being hollow except for the central driving shaft and connected to a vacuum producing source whereby volatiles are drawn from the wiped-film and the polymer nip. The pumping section is designed to compress the wiped-film into a continuous body for passing to subsequent processing, for instance, to an extruder. Due to the relatively high rate of rotation of the screw within the barrel and the relatively thin film (about 0.15 inch maximum in thickness in the vacuum section) the relatively viscous polymer is subjected to a rate of shear of 500–2,000, usually less than about 1,700 reciprocal seconds. The design also allows rapid exposure of fresh surfaces of the polymer for maximum removal of volatiles which may comprise monomers, water or solvent present in the molten polymer.

Still in accordance with the present invention, several alternative procedures may be employed such as separated flights, flights having differing clearances from the barrel and discontinuous mixing strips positioned parallel to the flights, said strips having clearances greater than that of the nearest flight, but still less than about 0.20 inch.

The accompanying illustrative drawings show certain features of the wiped-film evaporators of this invention. FIGURE 1 is a longitudinal cross-section of the basic evaporator design. FIGURE 2 is a sectional view of an alternative design wherein strips are attached to the core as briefly referred to above for improvement in film disturbance and mixing. FIGURE 3 is a cross-section of the latter piece of apparatus.

In FIGURE 1, the entire device is divided into two sections by the letters B and C. The section designated as B is the devolatilizing section which operates under vacuum, while section C is the metering section which develops a positive pressure. The apparatus consists essentially of a barrel 1 into which there is fitted a screw device 2, which is rotatively driven from either end by a suitable power source not shown. The polymer containing the volatile component to be removed is continuously fed into an annular distributor ring 3 and advanced by the rotation of screw 2 through the devolatilizing section to the pumping section. Since the polymer containing the minor amount of volatiles is in a plastic or melted state at the time of introduction, no melting stage in the equipment is required. Heat may be introduced or withdrawn by suitable jacketing of the barrel. The operation of the device is dependent upon the creation of a thin wiped-film on the interior surface of the barrel by rotation of the screw, the flights 4 having a clearance of less than about 0.15 inch and usually less than about 0.10 inch. The core of the screw 5 is hollow and contains slots not shown for withdrawal of vaporized volatiles from the wiped film as it progresses through the devolatilizing section. Withdrawal of vapors through the slots or other equivalent openings in the hollow core is promoted by maintaining a vacuum created by a vacuum source not shown. At the entrance to section C, the cross-section is normally reduced and pressure permitted to build up for the purpose of creating a steady flow of polymer to the exit 6.

FIGURE 2 is a side view of the devolatilizing section of an alternate design comprising the barrel 1, which is usually 2–36 inches in diameter, the screw 2, comprised the flights 4 and 5 but bearing mixing strips 7 affixed to the core and parallel to the flights. These mixing strips are relatively short and discontinuous and may be of any desired number and frequency. Usually they are in the order of 0.1 to 1 inch long and relatively narrow, in the order of .05 to .25 inch, the clearance being optional but preferably somewhat greater than that of the nearest flight clearance but less than about 0.20 inch. It is preferred where sets of the mixing strips are installed as shown in FIGURE 2 that the clearance of individual strips of each set be different so as to promote maximum mixing effect. Vapor removal slots 8 are positioned along the screw 5.

FIGURE 3 is an end cross-section taken through III—III of FIGURE 2. Again, the vapor removal slots in the core are not shown. FIGURE 3 shows an additional variance in the design of the devolatilizing section of the evaporator in that the continuous flights affixed to the core have varying clearance and the small narrow mixing strips near each flight have varying clearances related to that of the nearest flight.

While the apparatus described and claimed is normally sufficient for the reduction of volatiles to an acceptable level, if desired the device may be used in series with a second evaporator or a devolatilizing extruder of normal design operated at the same or a higher vacuum.

The wiped-film evaporator may have any number of desired flights, preferably between about 4 and 20 and usually between about 6 and 12. The channel depth may be varied depending upon the over-all size of the equipment as can the diameter of the barrel. The length to diameter will influence the device and will be varied depending on the specific physical properties and volatiles content of the product to be treated. Furthermore, the flight width (land) may be varied as well as the flight angle, and usually will be between about 0.1 inch and about 1.0 inch in land width, the flight angle from the normal to the axis of the screw being between about 15 and about 60 degrees. The device may be operated in any suitable position.

The following example serves to illustrate the use of this invention.

EXAMPLE I

A molten polystyrene comprising 2260 lb./hr. of a high-impact interpolymer of styrene with a minor amount of a rubber and containing about 3.5% by weight of styrene monomer was introduced at 204° C. through the annular distribution ring of the devolatilizing section of the evaporator which was operated under a vacuum of 10.0 millimeters of mercury, the rotation of the screw being 150 r.p.m., with a flight clearance of about 0.100 inch. Under these conditions the film of molten high impact polystyrene is being sheared at a rate of 1400 reciprocal seconds throughout the device which was 9.5 feet long and 18 inches in diameter. The monomer vapors were withdrawn through slotted openings in the core and the devolatilized polymer proceeded to the pumping section from which it exited having a monomer content of 0.16%.

We claim as our invention:
1. A wiped-film evaporator for removing normally volatile fluids from molten but normally solid polymers at temperatures above the polymer softening point but below the decomposition temperature of the polymer which comprises a cylindrical barrel comprising a vacuum section followed by a pumping section, a single screw rotatably mounted in the barrel by a shaft passing through both sections, said screw comprising a hollow core bearing multiple helical flights positioned to wipe a film of the polymer on the interior wall of the barrel, said film being out of contact with openings in the hollow portion of the core, mixing strips less than one inch in length intermittently positioned on the core in several rows parallel to the flights, means for applying a vacuum through said hollow core whereby volatiles are drawn thereinto from the wiped-film, the clearance between the barrel interior and the flight end faces being less than about 0.15 inch in the vacuum section, means for developing positive pressure in the pumping section, the flight-to-barrel clearance in the pumping section being at least .005 inch and a product exit from the pumping section, the strips having strip-to-barrel clearances greater than that of the nearest flight clearance but less than about 0.20 inch.

2. An apparatus according to claim 1 wherein the exit from the pumping section leads to a finishing extruder rather than directly to a die.

3. An apparatus according to claim 1 wherein at least one flight has a flight clearance substantially greater than the flight clearance of a second flight.

References Cited

UNITED STATES PATENTS

| 2,542,269 | 2/1951 | Zahm. | |
|---|---|---|---|
| 2,944,047 | 7/1960 | Schutze et al. | 260—88.2 |
| 3,067,462 | 12/1962 | Kullgren | 18—12 |
| 3,211,209 | 10/1965 | Latinen et al. | |
| 3,242,969 | 3/1966 | Kiguchi. | |
| 3,375,549 | 4/1968 | Geyer. | |
| 3,409,937 | 11/1968 | Klosek et al. | |
| 1,858,956 | 5/1932 | Hepperle | 25—14 |

NORMAN YUDKOFF, Primary Examiner

J. SOFER, Assistant Examiner

U.S. Cl. X.R.

18—12; 159—13